March 18, 1969     R. A. PHILLIPS     3,434,035
STARTING CIRCUIT FOR MAGNETIC CORE VOLTAGE INVERTER SYSTEM
Original Filed Feb. 2, 1967
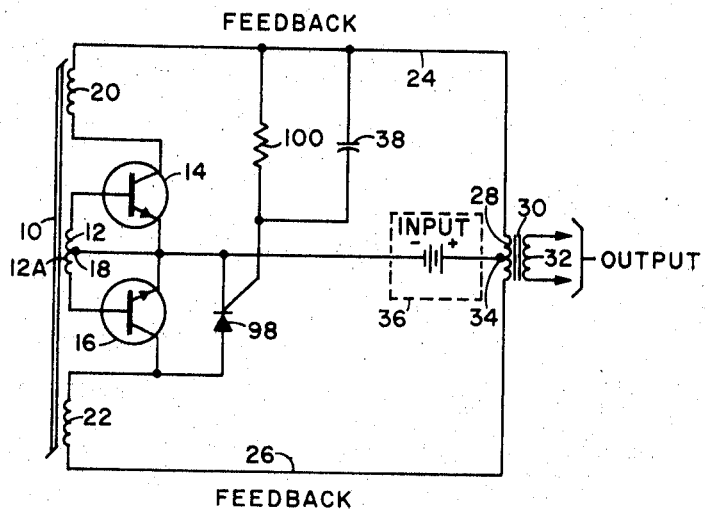
INVENTOR.
ROBERT A. PHILLIPS
BY
ATTORNEYS

United States Patent Office 3,434,035
Patented Mar. 18, 1969

3,434,035
STARTING CIRCUIT FOR MAGNETIC CORE
VOLTAGE INVERTER SYSTEM
Robert A. Phillips, Scottsdale, Ariz., assignor to Motorola, Inc., Franklin Park, Ill., a corporation of Illinois
Original application Feb. 2, 1967, Ser. No. 613,564. Divided and this application May 1, 1968, Ser. No. 725,597
U.S. Cl. 321—45           2 Claims
Int. Cl. H02m 7/52; H03k 3/26

ABSTRACT OF THE DISCLOSURE

A starting circuit for a two-transformer transistorized inverter circuit which does not load the power supply during inverter operation. A silicon controlled rectifier type of device is actuated to conduct current across one transistor to initiate initial current conduction in the inverter. Once the inverter starts operating the starting circuit is effectively isolated from the inverter circuit.

Related application

This application as a divisional patent application based upon my previously filed case Ser. No. 613,564 bearing a filing date of Feb. 2, 1967.

Background of the invention

This invention relates to starting circuits for semiconductor voltage inverter circuits, and particularly to starter circuits for inverter circuits utilizing two cores including feedback between the cores and transistors.

Voltage inverters are widely used to convert from DC to AC. Such inverter circuits are characterized by recurrent switching of current conduction states of various components and alternately saturating magnetic transformers between their opposite magetic polarities or states. Such circuits include feedback means for sustaining such recurrent switching or oscillations and which may either be related to the current amplitude output or the voltage amplitude output. Such arrangements are well known.

Various forms of inverter circuits have different operating and starting characteristics. For example, those inverters utilizing current feedback operate satisfactorily with high current amplitude output, but with small amplitude current output do not always reliably oscillate, and are difficult to start. Further, it is often desired that such inverters start out in the same manner every time they are operated. That is, a particular transistor will always be the first one to conduct a current while a second transistor is always the first one in a current nonconductive state. Usually such inverters will start oscillations with one transistor conducting rather than the other depending on the particular circuit and device characteristics which will vary from one circuit to the next. Also, when the start circuit remains operative after the inverter is operating, certain inefficiencies are introduced into inverter operation.

Summary of the invention

Therefore, it is an object of this present invention to provide a voltage inverter circuit which has positive starting capabilities under most load conditions.

It is another object of this invention to provide an automatic starting circuit in a voltage inverter circuit which is automatically effectively decoupled from the inverter circuit during normal operation of such inverter.

According to this invention a silicon controlled rectifier (SCR) is connected in parallel circuit relation to one transistor of a two-transformer solid-state inverter circuit. An RC circuit is connected to the SCR gate electrode and to a point in the inverter circuit. When power is first supplied to the inverter circuit, the capacitor in the RC circuit passes the voltage from the circuit point to the gate electrode for firing the SCR. SCR draws current through a winding of a transformer supplying base drive to initiate conduction of the same transistor each time the inverter is to be started. The starting transistor is usually the one in parallel circuit relation to the SCR.

The drawing

The attached drawing is a schematic diagram of an embodiment of my invention using an SCR in the starting circuit.

Detailed description of the illustrative embodiment

Referring now to the figure, there is shown a saturable core 10 exhibiting rectangular hysteresis characteristics. On core 10 there is wound a center tap winding 12 having opposite ends connected to the control or base portions of transistor switches 14 and 16. The emitters or first output portions of the two transistors are commonly connected to center tap 18 of winding 12. Regenerative feedback windings 20 and 22 are respectively connected to the collector electrodes or second output portions of transistors 14 and 16. The opposite ends of windings 20 and 22 are respectively connected over feedback lines 24 and 26 to opposing ends of winding 28 which is wound on transformer core 30. It is preferred that transformer core 30 is operated in a linear mode. Output winding 32 is wound on core 30 or alternatively an auto transformer connection may be made with winding 28. Winding 28 is center tapped at 34 and is connected to power supply means 36. The other end of the power supply means 36 is connected to center tap 18 of winding 12 for completing the inverter circuit.

The operation of the circuit is briefly described by first assuming that transistor 14 is conducting current, and transistor 16 is nonconductive. As transistor 14 conducts current, core 10 becomes saturated due to the action of windings 20 and 12, which in turn results in a decrease of output signal amplitude in winding 32. At maximum current conduction through transistor 14, transistor 16 is driven further into current nonconduction. However, when magnetic saturation is reached in core 10, the base drive to transistor 14 is reduced. This action permits the magnetic field of core 10 to collapse inducing base drive voltage in winding portion 12A for transistor 16. This drive voltage in turn is amplified through the transistor into winding 22 which further drives the magnetic core 10 toward opposing magnetic saturation. The whole circuit is regenerative and quickly transistor 14 stops conducting while transistor 16 begins conducting. When transistor 16 reaches full conduction and the current amplitude is the greatest, the above-described operation is repeated. In this manner the inverter circuit oscillates to provide an alternating voltage output through winding 32. It is usual, when a DC voltage is desired, to place a rectifier and a filter (not shown) across winding 32.

The starting circuit having SCR 98, resistor 100 and capacitor 38 is connected as shown. When the circuit is first started, as by connecting input or power supply circuit 36 into the circuit, the starting circuit causes transistor 16 to first conduct current. The circuit always starts in this manner. After the circuit is started the starting circuit is held deactivated.

The detailed description of starting the circuit follows: When the inverter input means or power supply 36 is first turned on, both lines 24 and 26 become positive with respect to center tap 18. When this action occurs, capacitor 38 makes the gate electrode of SCR 98 positive with respect to center tap 18 by passing the voltage from line 24. The anode voltage of SCR 98 is also positive with respect to center tap 18. Thus SCR 98 becomes conductive drawing current through winding 22 driving transistor 16 to current conduction through inductive action of windings 22 and 12A. This action starts the inverter operation. When transistor 16 conducts, SCR 98 will become and remain nonconductive only if $V_{CE(SAT)}$ of transistor 16 or other switch means is less than the cathode-to-anode voltage required to maintain holding current in SCR 98. After the square loop transformer 10 has switched magnetic states and transistor 14 becomes conductive, the voltage on capacitor 38 biases the gate of SCR 98 negative with respect to the cathode, keeping SCR 98 extinguished or nonconductive. Therefore, the only time that SCR 98 can be conductive is when the circuit has not started. The reason for resistor 100 is to keep capacitor 38 discharged until turn on by means 36. It is necessary that transistor 16 becomes conductive to current saturation during the first half-cycle of operation.

What is claimed is:
1. A voltage inverter circuit having a starting circuit portion which does not load the inverter when operating, including in combination,
   a first transformer having a saturable magnetic core with first and second feedback windings, each feedback winding with first and second free ends, and a center tap winding with a pair of free ends and a center tap connection,
   an output transformer having an output winding and a center tap primary winding with a pair of free ends and a center tap connection,
   first and second transistors each having a control portion and a pair of output portions, one of said output portions of each transistor being connected together and to said center tap connection of said center tap winding on said first transformer,
   first free ends of said first and second feedback windings being connected respectively to the free ends of said primary winding of said second transformer,
   second ones of said free ends of said first and second feedback windings on said first transformer being connected respectively to output portions other than said one output portion of said first and second transistors,
   DC power supply means connected between said center tap of said primary winding and said one output portions,
   a silicon controlled rectifier having a pair of current path electrodes and a gate electrode, said current path electrodes being connected respectively to said output portions of said second transistor,
   an RC network connected to said first free end of said first actuating winding and to said gate electrode for supplying an actuating signal thereto when said power supply means first initiates inverter operation.
2. The circuit of claim 1 wherein said one output portions are emitters of said transistors.

References Cited

UNITED STATES PATENTS

| | | |
|---|---|---|
| 2,783,384 | 2/1957 | Bright et al. |
| 2,916,704 | 12/1959 | Morey _____ 331—113 |
| 2,950,446 | 8/1960 | Humez et al. _____ 331—114 |
| 3,172,060 | 3/1965 | Jensen. |
| 3,308,397 | 3/1967 | Morgan. |
| 3,344,362 | 9/1967 | Lingle. |

JOHN F. COUCH, *Primary Examiner.*

W. M. SHOOP, JR., *Assistant Examiner.*

U.S. Cl. X.R.

331—113